(12) United States Patent
Sharan et al.

(10) Patent No.: US 10,846,342 B2
(45) Date of Patent: Nov. 24, 2020

(54) ARTIFICIAL INTELLIGENCE-ASSISTED INFORMATION TECHNOLOGY DATA MANAGEMENT AND NATURAL LANGUAGE PLAYBOOK SYSTEM

(71) Applicants: Dhiraj Sharan, Brookings, SD (US); Shaswat Anand, Kankarbagh (IN)

(72) Inventors: Dhiraj Sharan, Brookings, SD (US); Shaswat Anand, Kankarbagh (IN)

( * ) Notice: Subject to any disclaimer, the term of this patent is extended or adjusted under 35 U.S.C. 154(b) by 87 days.

(21) Appl. No.: 16/208,843

(22) Filed: Dec. 4, 2018

(65) Prior Publication Data

US 2020/0175077 A1    Jun. 4, 2020

(51) Int. Cl.

| G06F 17/27 | (2006.01) |
|---|---|
| G06F 16/9032 | (2019.01) |
| G06F 16/903 | (2019.01) |
| G06F 11/34 | (2006.01) |
| G06F 16/9038 | (2019.01) |
| G06F 9/451 | (2018.01) |
| G06Q 10/06 | (2012.01) |
| G06F 21/57 | (2013.01) |

(52) U.S. Cl.
CPC ........ *G06F 16/90332* (2019.01); *G06F 9/451* (2018.02); *G06F 11/3476* (2013.01); *G06F 16/9038* (2019.01); *G06F 16/90335* (2019.01); *G06F 21/57* (2013.01); *G06Q 10/063* (2013.01)

(58) Field of Classification Search
CPC .. G06F 9/451; G06F 11/3476; G06F 16/9038; G06F 16/90332; G06F 16/90335; G06F 21/57; G06F 11/323; G06F 11/3438; G06F 17/40; G06Q 10/063

USPC .......................................................... 709/9
See application file for complete search history.

(56) References Cited

U.S. PATENT DOCUMENTS

| 8,661,456 B2 * | 2/2014 | Wang ..................... G06F 9/547 |
| | | 719/318 |
| 9,569,471 B2 * | 2/2017 | Sharan ................. G06F 16/212 |
| 9,853,941 B2 * | 12/2017 | Liang ................. H04L 63/0209 |
| 10,356,044 B2 * | 7/2019 | Liang .................... G06F 9/4843 |

(Continued)

*Primary Examiner* — Khai N. Nguyen
(74) *Attorney, Agent, or Firm* — Pharar Patents & Intellectual Property; Andrew A. Pharar

(57) ABSTRACT

The artificial intelligence-assisted information technology data management and natural language playbook system disclosed herein is designed to support current enterprise information technology security personnel by providing a faster and easier method for finding information or anomalies in current system data and logs. Enterprise security divisions often use multiple security information and event management (SIEM) software platforms to monitor their personnel data and logs, though even the use of such platforms requires advanced knowledge and skill on behalf of the user. The current system allows security users of all skill levels to interact using natural language processing with the system and effectively investigate such data and logs. The system assists such users by interacting with these SIEM platforms on their behalf and providing the users with access to pre-programmed natural language inquiry sequences, called "playbooks," and easily customizable output displays. The software is entirely web-based, though can be integrated into current SIEM consoles for streamlined use.

18 Claims, 7 Drawing Sheets

(56) References Cited

U.S. PATENT DOCUMENTS

| | | | | |
|---|---|---|---|---|
| 2012/0311562 A1* | 12/2012 | Wang | ................ | H04L 67/22 |
| | | | | 717/177 |
| 2012/0311611 A1* | 12/2012 | Wang | ................ | G06F 9/541 |
| | | | | 719/318 |
| 2013/0198168 A1* | 8/2013 | Huang | ................ | G06F 16/245 |
| | | | | 707/722 |
| 2014/0059683 A1* | 2/2014 | Ashley | ................ | H04L 63/1425 |
| | | | | 726/23 |
| 2014/0156711 A1* | 6/2014 | Sharan | ................ | G06F 16/212 |
| | | | | 707/804 |
| 2014/0317737 A1* | 10/2014 | Shin | ................ | H04L 63/1408 |
| | | | | 726/23 |
| 2015/0381647 A1* | 12/2015 | Huang | ................ | H04L 63/1425 |
| | | | | 726/22 |
| 2018/0124014 A1* | 5/2018 | Liang | ................ | H04L 63/20 |
| 2019/0182267 A1* | 6/2019 | Aher | ................ | G06F 11/302 |
| 2019/0220374 A1* | 7/2019 | Wei | ................ | G06F 11/203 |
| 2020/0127893 A1* | 4/2020 | Hume | ................ | H04L 41/0893 |

* cited by examiner

United States Patent US 10,846,342 B2

ARTIFICIAL INTELLIGENCE-ASSISTED INFORMATION TECHNOLOGY DATA MANAGEMENT AND NATURAL LANGUAGE PLAYBOOK SYSTEM

TECHNICAL FIELD OF THE INVENTION

The present invention relates in general to information technology data management, and, more specifically, to an artificial intelligence-assisted information technology data management and natural language playbook system.

BACKGROUND OF THE INVENTION

Enterprise information security architecture (EISA) is the practice of applying a comprehensive and rigorous method for describing a current and/or future structure and behavior for an organization's security processes, information security systems, personnel, and organizational sub-units, so that they align with the organization's core goals and strategic direction. Although often associated strictly with information security technology, it relates more broadly to the security practice of business optimization in that it addresses business security architecture, performance management, and security process architecture as well. The primary purpose of creating an enterprise information security architecture is to ensure that business strategy and information technology (IT) security are aligned. As such, enterprise information security architecture allows traceability from the business strategy down to the underlying technology through data tracking and logging.

To monitor such architectures, enterprises employ IT security personnel to analyze such data and logs. Such security personnel are able, via the data and logs, to review and consider various parameters related to the behavior of employees within the enterprise and the handling of data by such employees. Processing through such data and logs, though, may be a cumbersome and time-intensive task, especially where the enterprise comprises a large number of employees, a small number of IT security personnel, or insufficiently trained IT security personnel.

Multiple security information and event management (SIEM) software platforms already exist to assist with such a security analysis, such as Splunk, ArcSight, and QRadar, which may aggregate relevant data from multiple data and log sources, identify deviations from normal behavior, and take appropriate action. Such platforms help to reduce the time burden of analyzing security data and logs and improve the efficacy of such analyses by security personnel, though, because such systems require structured search and other structured command-line inputs, the user must still be trained sufficiently to effectively direct and train the system. Users lacking in sufficient training are often unable to maximize the effectiveness of their analysis or maximize the potential of the software itself.

Thus, there is a need in the art for an artificial intelligence-assisted information technology data management and natural language playbook system that streamlines and augments the security analysis process through the implementation of an interactive artificial intelligence, natural language processing, and playbook protocols.

BRIEF SUMMARY OF THE INVENTION

To minimize the limitations in the prior art, and to minimize other limitations that will be apparent upon reading and understanding the present specification, the present invention describes an artificial intelligence-assisted information technology data management and natural language playbook system.

It is an objective of the present invention to provide a data management and playbook system that may be implemented on a computing device.

It is another objective of the present invention to provide a data management and playbook system that may comprise a proprietary software.

It is another objective of the present invention to provide a data management and playbook system that may comprise a central database.

It is another objective of the present invention to provide a data management and playbook system that may comprise a cloud-based application program interface.

It is another objective of the present invention to provide a data management and playbook system that may interact with existing security information and event management software platforms.

It is another objective of the present invention to provide a data management and playbook system that may interact with existing internet search engine platforms.

is another objective of the present invention to provide a data management and playbook system that may comprise machine learning technology.

It is another objective of the present invention to provide a data management and playbook system that may comprise a plurality of playbooks.

It is another objective of the present invention to provide a data management and playbook system that may comprise natural language processing.

It is another objective of the present invention to provide a data management and playbook system that may comprise voice-interactivity.

It is another objective of the present invention to provide a data management and playbook system that may comprise visual-interactivity.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Figure 1:
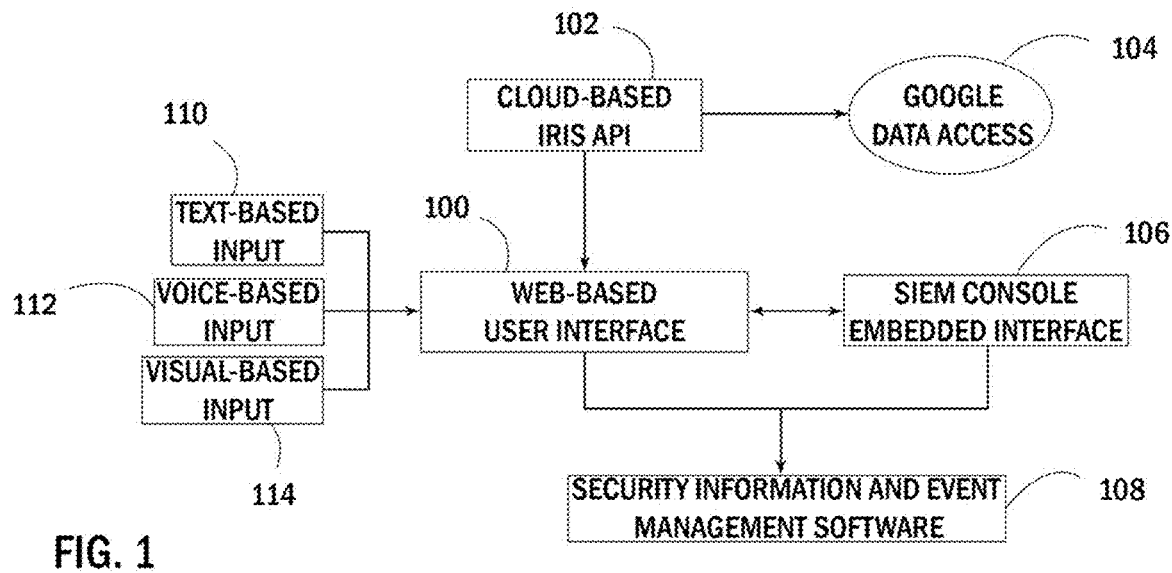
FIG. 1 schematically presents an artificial intelligence-assisted information technology data management and natural language playbook system, as contemplated by the present disclosure.
Figure 2:
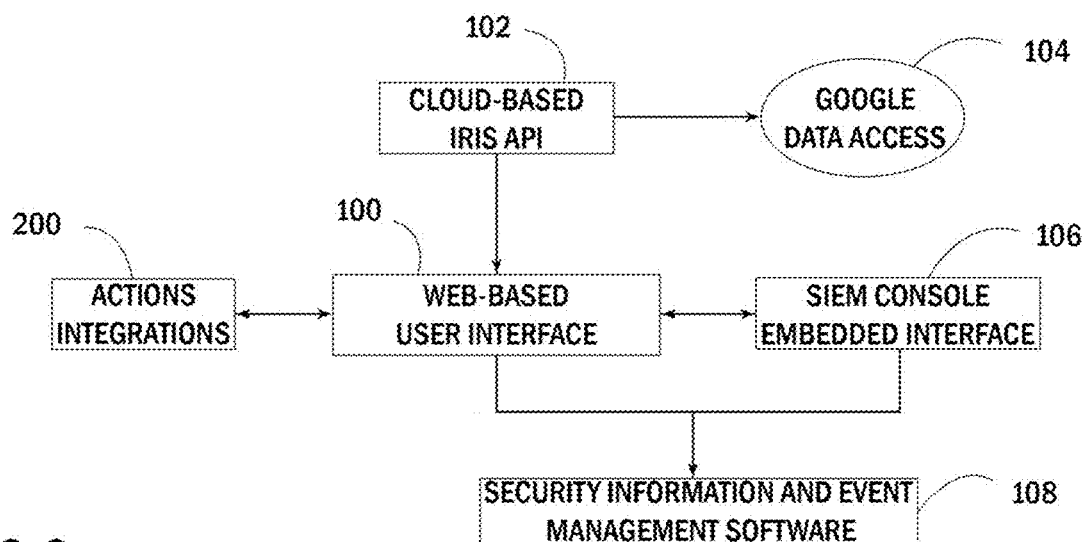
FIG. 2 schematically presents an artificial intelligence-assisted information technology data management and natural language playbook system, as contemplated by the present disclosure.
Figure 3:
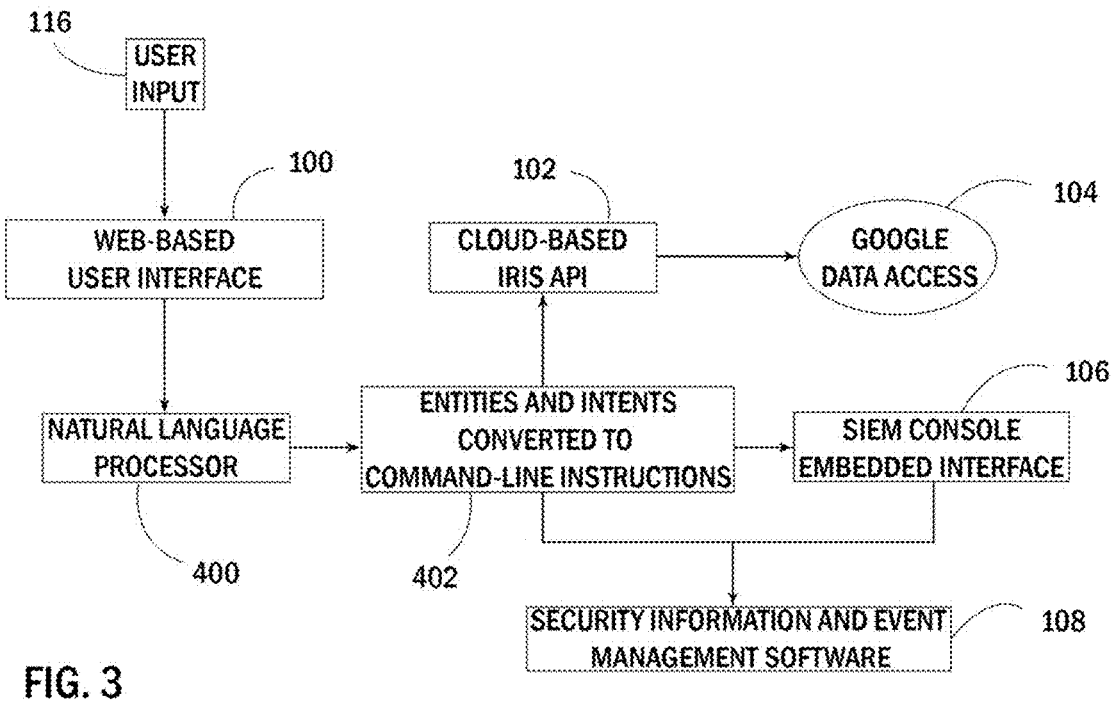
FIG. 3 schematically presents an artificial intelligence-assisted information technology data management and natural language playbook system, as contemplated by the present disclosure.
Figure 4:
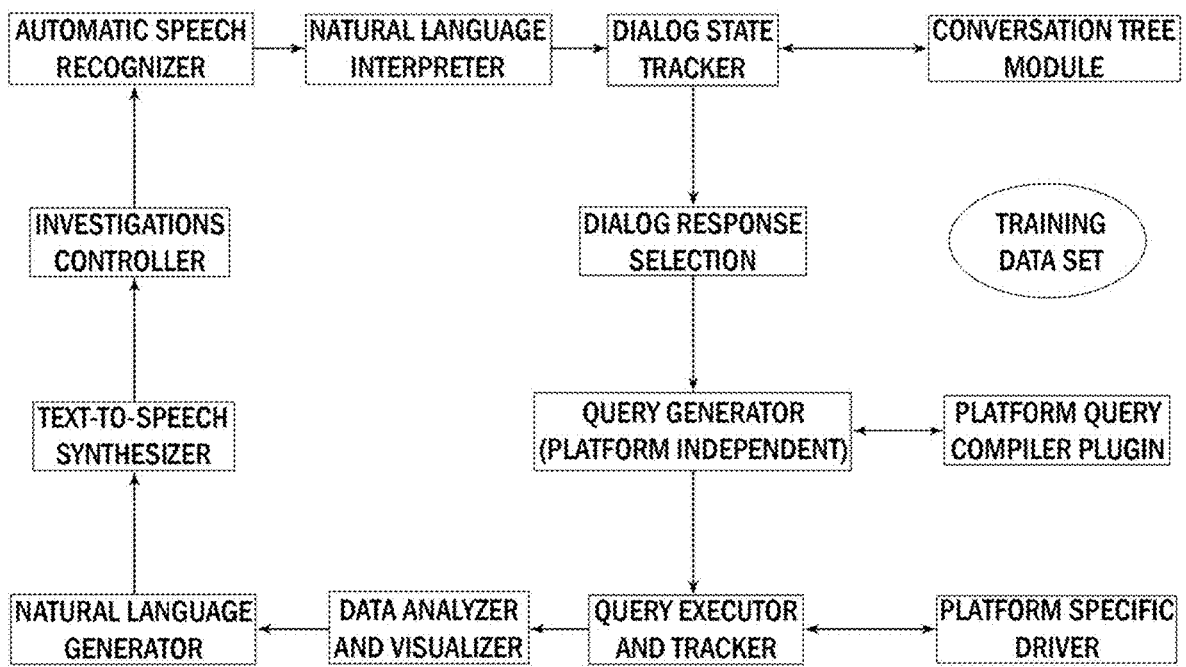
FIG. 4 schematically presents an artificial intelligence-assisted information technology data management and natural language playbook system, as contemplated by the present disclosure.

Certain terminology is used in the following description for reference only and is not limiting. Unless specifically set forth herein, the terms "a," "an," and "the" are not limited to one element, but instead should be read as meaning "at least one." The terminology includes the words noted above, derivatives thereof, and words of similar import.

The present invention relates in general to information technology data management, and, more specifically, to an artificial intelligence-assisted information technology data management and natural language playbook system. As contemplated by the present disclosure, the system may comprise a proprietary software on a computing device, a cloud-based user interface, and a plurality of natural language playbooks. The proprietary software may receive inputs from a user of the system via text-based, voice-based, or visual-based inputs and may itself interact with a plurality of existing technologies for ease of implementation.

The illustrations of FIGS. 1-4 schematically present an artificial intelligence-assisted information technology data management and natural language playbook system. As contemplated by the present disclosure, the data management and natural language playbook system may comprise a web-based user interface 100 accessible by a user via the internet. The proprietary software of the system may be installed on a central database and may comprise a cloud-based investigations response intelligence service (IRIS) application program interface (API) 102. The present system is intended to interface seamlessly with already-existing information technology (IT) security setups, many of which comprise multiple-display consoles visualizing a plurality of software APIs and multiple security information and event management (SIEM) programs 108 simultaneously. For this reason, the web-based user interface 100 may further comprise an SIEM console embedded interface 106 that may be integrated into or displayed alongside commonly-used software APIs. Though the data management and natural language playbook system software may be installed onto and integrated within a user's system, it is contemplated that the data management and natural language playbook system may function by, at a minimum, only receiving data analyses performed by SIEM software 108 already installed in the organization's IT network.

Once accessed, the web-based user interface 100 may be interacted with by text-based input 110, voice-based input 112, or visual-based input 114. In an embodiment comprising text-based input 110, the user may type queries and commands into the user interface 100 using any appropriate input source, such as a physical or virtual keyboard or a smartphone or tablet device connected to the system, whether physically or wirelessly. In an embodiment comprising voice-based input 112 the user may interact with the system using a microphone, whether individually or integrated into a smartphone or tablet device, and the system may comprise speech recognition and language interpretation components to understand and interpret the input. In an embodiment comprising visual-based input 114 the user may interact with the system using interactive controls and clickable shortcuts in the web-based graphical user interface (GUI).

Central to the concept of the present disclosure is the application of a natural language to structured commands convertor 400, which may be based on applying existing natural language processing concepts, to current SIEM interfaces 108. Current natural language processors 400 work by applying lemmatization and tokenization concepts to language inputs to extract the entities and intent of the given instruction. This process involves the analyzing of input terms and the analyzing of used syntax and inflection to determine blocks of entities in the input, and then converting those entities and intents into relevant structured commands 402. Where current SIEM software 108 requires the user to input structured commands appropriate to the language of the software, the present system receives a natural language input from the user and automatically generates the appropriate command line instruction or sequence of command line instructions 402 for the chosen SIEM software 108.

By way of example, if a user inputs a natural language command such as "show all users who are currently logged-in from multiple locations," the present system receives and translates the natural language input into the SIEM-specific commands for analyzing user logins, determining which users are logged-in from multiple locations, and then displaying the results of the command inquiries. If the user inputs a natural language command such as "show me a bar graph of login failures by user," the present system receives and translates the natural language input into the SIEM-specific commands for calculating user login failures, returning the results of the query, and then visually displaying the results in a bar graph of login failures per username. The user may then further specify a time frame by inputting, for example, "show me the results for the past 30 days," and the system will apply the appropriate commands for narrowing the results of the previous inquiry.

The system may then make of record of the types of commands and follow-up commands it processes, and may automatically store this record as a preferred sequence of commands, which may be known as a "workflow" or a "playbook," and which may be automatically or manually recalled by the user for future use by the system. As contemplated by the present disclosure, the system may associate various playbooks with commonly-run investigations performed on a given system, and may prioritize such playbook sequences when appropriate. A user of the system may also set priority levels for various playbooks within the system, to emphasize the relevance or importance of the particular playbook to the user's unique analysis requirements.

In one embodiment the system may receive an open-ended insight question, which, for example, may comprise a user commanding the system to "tell me some interesting alerts I should investigate today." The system, recognizing the open-ended nature of the inquiry, may then recall commonly-run or highly prioritized playbooks to analyze and return data relevant to the user and its unique analysis requirements. In this way the system adapts itself to the needs of the individual user, and also reduces the amount of time required by the user to perform analyses relevant to and unique within their individual security system. In a second embodiment the system may pull highly prioritized or relevant playbooks from a central database that may be run on the user's individual security system, so as to provide a user with additional insights into their security system that they may not have previously inquired into or considered relevant. In this way the system remains adapted to the individual user's needs, though also provides the user with additional investigations worth performing.

In more detail, the system implements domain knowledge with natural language processing to achieve the desired results. Domain knowledge, as contemplated by the present disclosure, may include the user workflows, configurations, and constraints relevant to each SIEM software 108. The natural language processor 400 of the system converts the entities and intents of the user's input into the command-line instructions 402 of each unique SIEM software 108 by applying such domain knowledge.

If a user input comprises conditional language, such as "if," "then," "else," "for," "while," or "loop," along with a domain-specific command by commanding the system to, for example, "for each locked employee account, notify their boss," the system may translate and perform the following sequence of steps:

Step 1: condition, action, and repetition pattern detection "<for-each><condition1><action1>"
Step 2: condition1 construction "account_status=locked"
Step 3: action1 construction "notify <boss>"
Step 4: resolve join field from condition1 to be "employee"
Step 5: resolve join field from action1 to be "boss"
Step 6: query employee table to find out boss
Step 7: repeat for every valid condition1

Once an input has been received, translated, and understood by the system the cloud-based IRIS API 102 may execute or facilitate the input. If, for example, the user input comprises a request for general information the cloud-based IRIS API 102 may interface with a web-based search engine 104, such as Google, to retrieve the requested information and present it to the user via the web-based user interface 100. If, as another example, the user input comprises commands related to analyzing the user's security data or logs, the cloud-based IRIS API 102 may interface with the user's SIEM software 108 to retrieve the requested information and present it to the user via the web-based user interface 100. The SIEM software 108 may refer to any one SIEM software 108 known in the art, or may comprise multiple SIEM software 108 installed in the user's IT network, and the system may query data from the single or multiple SIEM software 108 and return the results in a single, uniform display via the web-based user interface 100. In this way, a user may view, visualize, and interact with data from multiple SIEM software 108 seamlessly, and without worrying about from which source the data was retrieved. It is contemplated that the user may further command the cloud-based IRIS API 102 to interact with any appropriate actions integrations 200 already incorporated into the user's SIEM console.

The displaying of results via the web-based user interface 100 may be by any appropriate means. In one embodiment the web-based user interface 100 may display results as text. As an example, where the user requests information via the web-based search engine 104, the web-based user interface 100 may display a general summary of the information or the first few lines of text returned by the search along with a hyperlink to the source of the search results. The user's interaction with the hyperlink may then open the source of the search result in a web browser for the user to view directly. As another example, where the user requests information via the SIEM software 108, the web-based user interface 100 may display a list of data or log references called for or otherwise matching the user's search parameters. The user may modify the displayed output, as desired, by directing the web-based user interface to return the requested results as a visual or graphical display. The web-based user interface may also generate an audio output, to be played through speakers, headphones, or a smartphone or tablet connected to the system, which may read the results of a search out loud to the user or which may ask further questions of the user.

As contemplated by the present disclosure, a user input may be any inquiry, command, or other instruction appropriate for use in the IT security field. As used in the field, though, such user inputs may often follow a logical or standardized and repetitive sequence. To reduce the amount of work or skill required by the user to achieve their sought results, the artificial intelligence-assisted information technology data management and natural language playbook system may further comprise a programmed sequence of inputs, which may be known as a "playbook." A user accessing the web-based user interface 100 may load a playbook that the cloud-based IRIS API 102 may then execute. The results of each input in the sequence may be displayed, or only the final results of the playbook sequence may be displayed, as desired. The plurality of playbooks may be stored on the user's local system or may be shared to the central server of the system, and new playbooks may be written by users of the system for access by other users of the system. A user may further limit to whom access of playbooks may be granted, limiting access, for example, only to other users within the user's network.

Figure 5:
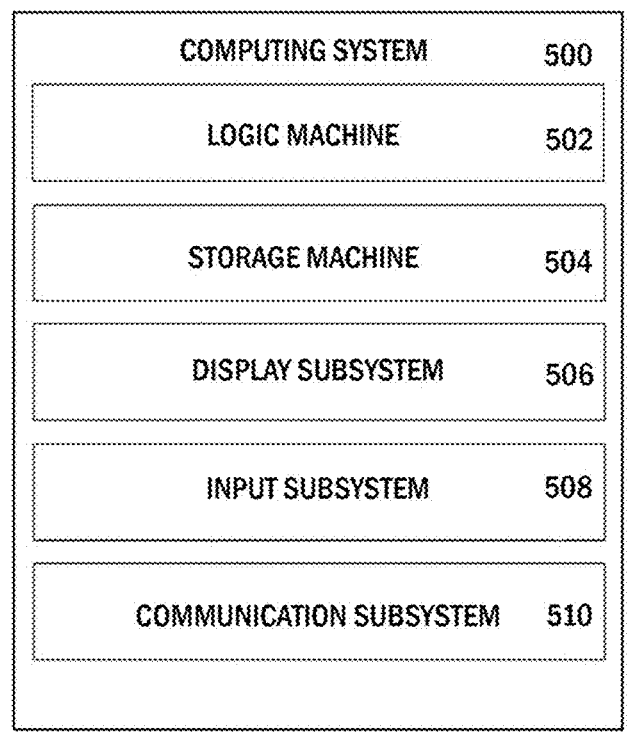
FIG. 5 schematically presents a computing system configured to carry out and actualize methods and tasks described herein, as contemplated by the present disclosure.

The illustration of FIG. 5 schematically presents a computing system that may represent an embodiment of the present invention. In some embodiments the method is executed on a computing system such as computing system 500 of FIG. 5. For example, storage machine 504 may hold instructions executable by logic machine 502 to provide the method to users. Display subsystem 506 may display the various elements of the method to participants. For example, display subsystem 506, storage machine 504, and logic machine 502 may be integrated such that the method may be executed while being displayed on a display screen. The input subsystem 508 may receive user input from participants to indicate the various choices or user inputs described above. The described method may be executed, provided or implemented to a user on one or more computing devices via a computer-program product such as via an application programming interface (API). FIG. 5 schematically shows a non-limiting exemplary embodiment of a computing system 500 that can enact the method described above. Computing system 500 may be any appropriate computing device such as a personal computer, tablet computing device, gaming device or console, mobile computing device, etc. Computing system 500 includes a logic machine 502 and a storage machine 504. Computing system 500 may include a display subsystem 506, input subsystem 508, and communication subsystem 510. Logic machine 502 may execute machine-readable instructions via one or more physical devices. For example, the logic machine 502 may be configured to execute instructions to perform tasks for a computer program. The logic machine may include one or more processors to execute machine-readable instructions. Storage machine 504 includes one or more physical devices configured to hold or store instructions executable by the logic machine to implement the method. When such methods and processes are implemented, the state of storage machine 504 may be changed to hold different data. For example, storage machine 504 may include memory devices such as various hard disk drives or CD or DVD devices. Display subsystem 506 may visually present data stored on storage machine 504. For example, display subsystem 506 may visually present data to form a graphical user interface (GUI). Input subsystem 508 may be configured to connect and receive input from devices such as a mouse, keyboard, or gaming controller. Communication subsystem 510 may be configured to enable system 500 to communicate with other computing devices. Communication subsystem 510 may include wired and/or wireless communication devices to facilitate networked communication.

Figure 6:
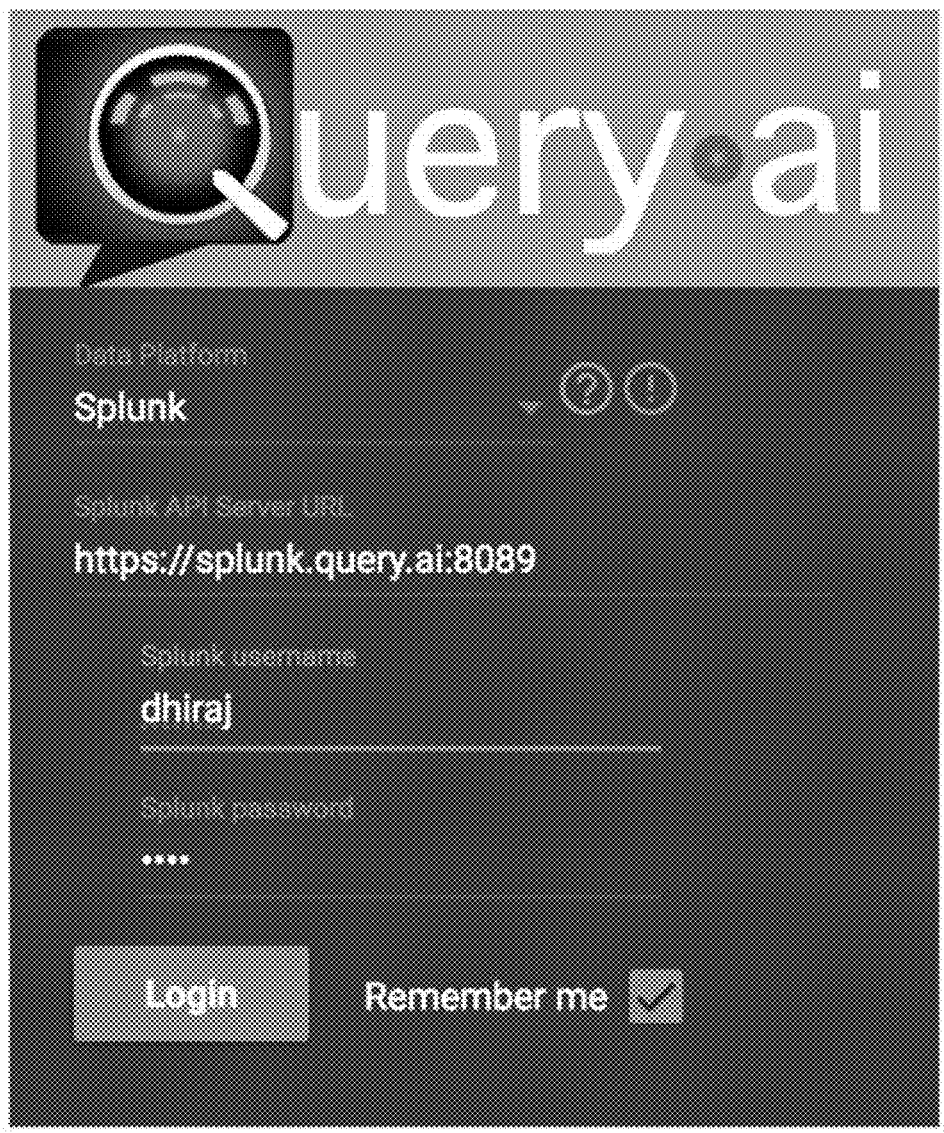
FIG. 6 illustrates a user login screen of an artificial intelligence-assisted information technology data management and natural language playbook system, as contemplated by the present disclosure.

The illustration of FIG. 6 illustrates a user login screen of an artificial intelligence-assisted information technology data management and natural language playbook system. A user of the system may begin by first selecting the data platform upon which their system is based, which may be any SIEM software or other appropriate software. The selection of the data platform allows the IRIS API to select the appropriate translational protocols for sending instructions to and receiving data from the SIEM software. The user may then enter the local area address of their data platform server so that the IRIS API knows where to send and receive the user's instructions and data. The user may finally enter a username and password to access their profile within the system, which may grant them access to any data for which they are authorized.

Figure 7:
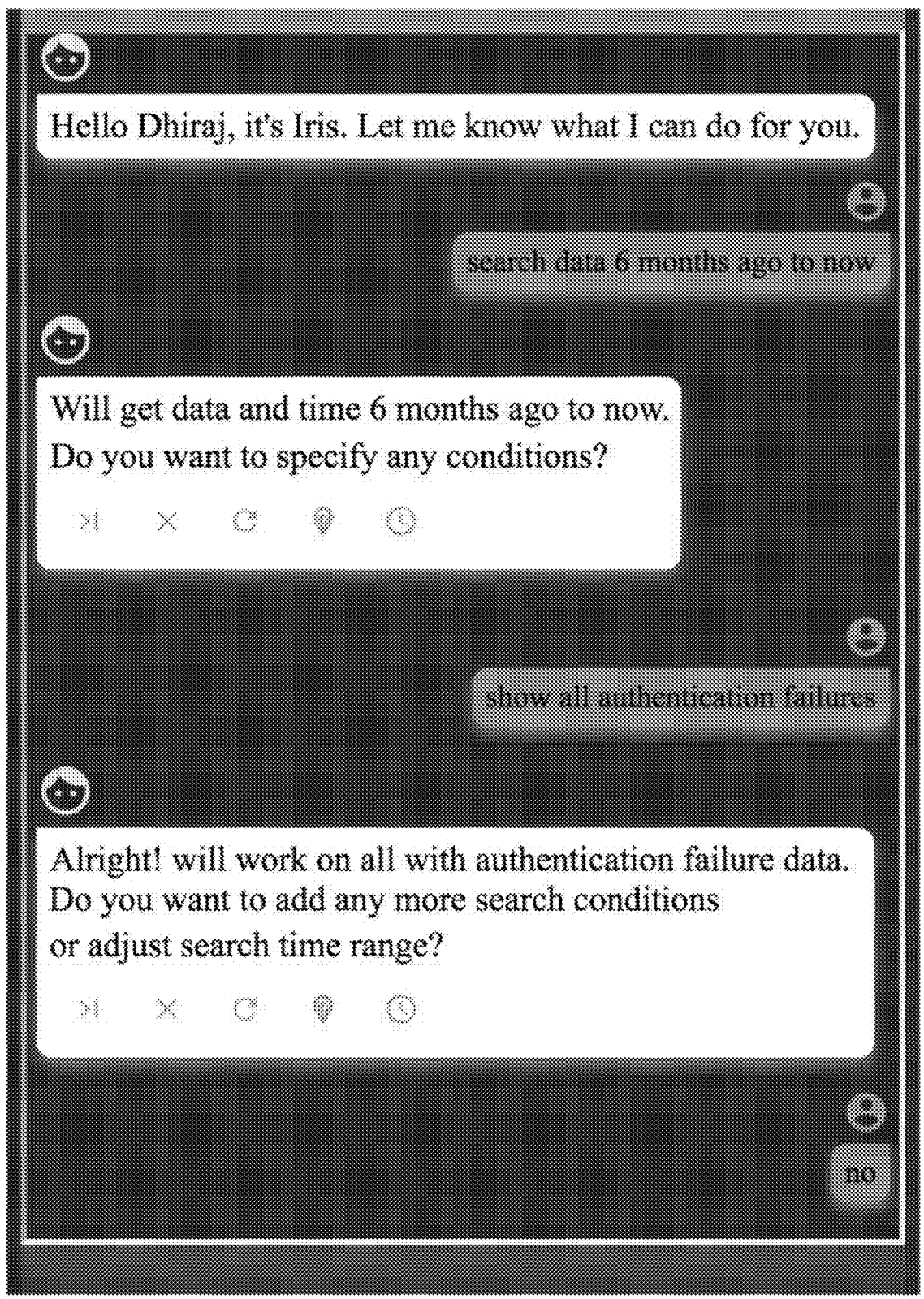
FIG. 7 illustrates a web-based user interface of an artificial intelligence-assisted information technology data management and natural language playbook system, as contemplated by the present disclosure.
Figure 8:
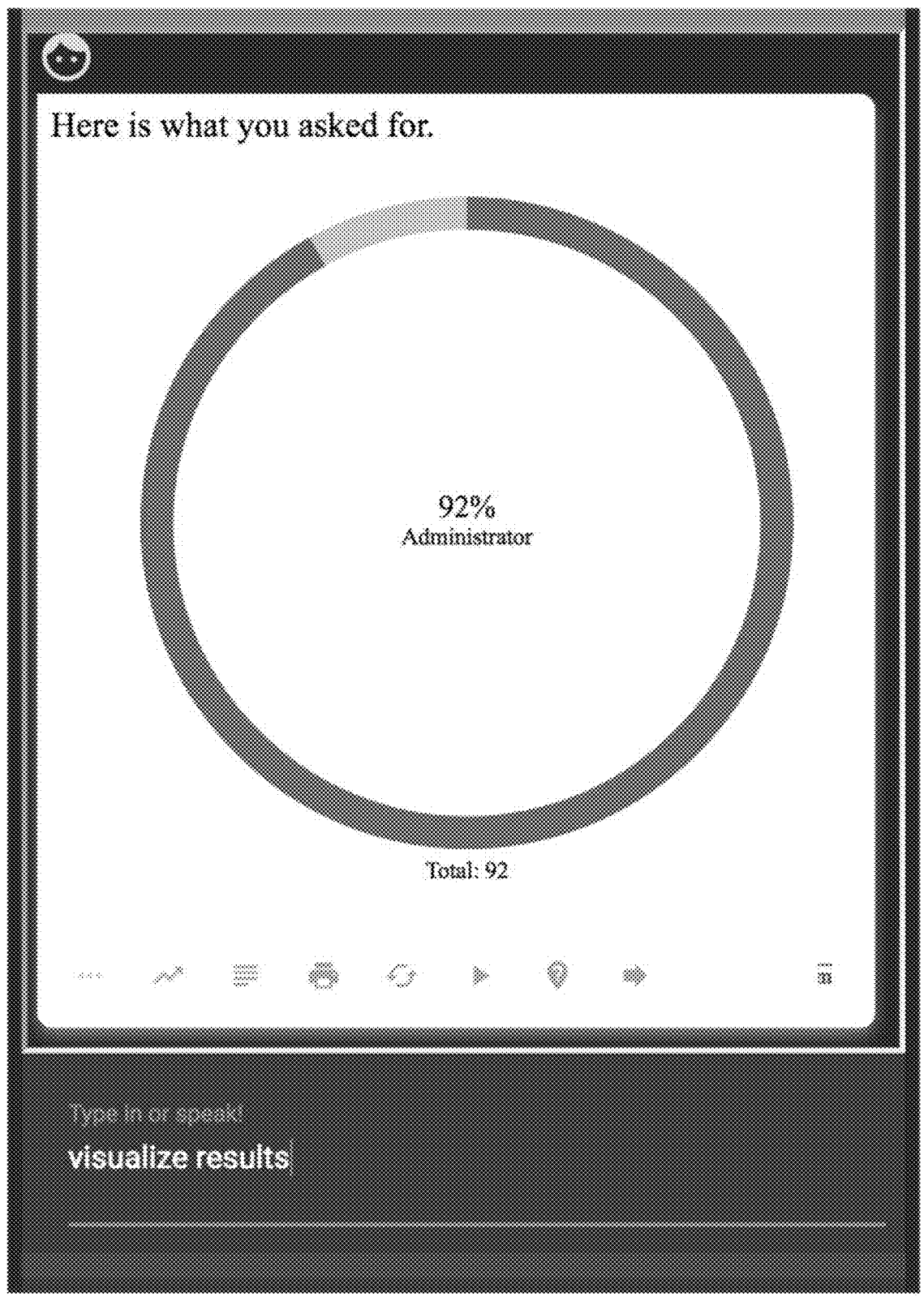
FIG. 8 illustrates a web-based user interface of an artificial intelligence-assisted information technology data management and natural language playbook system, as contemplated by the present disclosure.

The illustrations of FIGS. 7 and 8 illustrate a web-based user interface of an artificial intelligence-assisted information technology data management and natural language playbook system. Once the user has logged-into the system, the user may begin by entering instructions in the user interface, whether by text, voice, or visual input. The IRIS API may display inquiries and results within the user interface, and may further display entered text or transcribed voice or visual inputs in sequence to resemble a conversational progression. The format of the display output may be directed, as desired, by the system user, and the IRIS API may create visual or graphical output displays based on user parameters. The format of the display output may also be directed by the system, and the IRIS API may create visual or graphical output displays based on the optimal format for displaying such an output, which may be known as "data-driven visualization."

Figure 9:
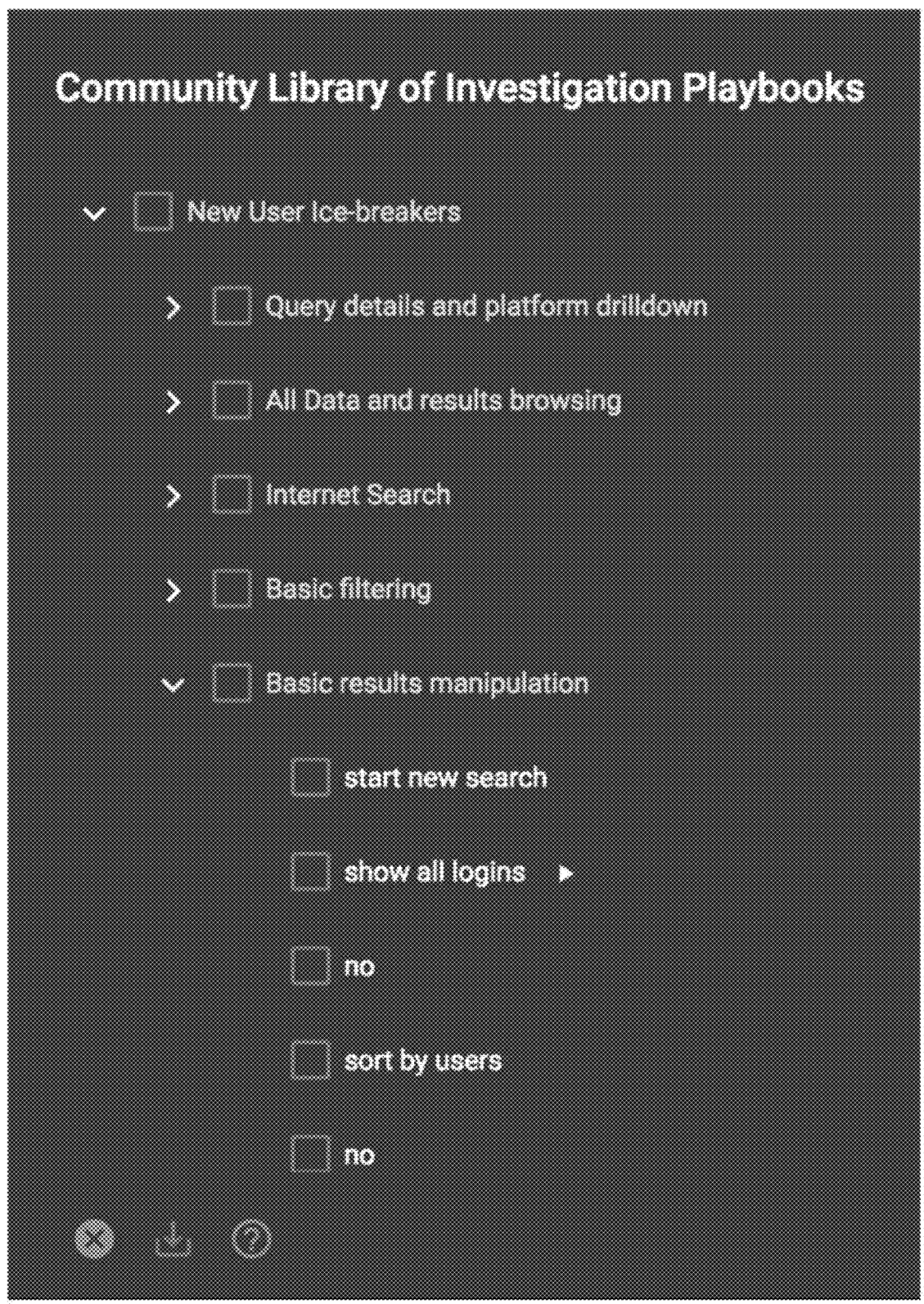
FIG. 9 illustrates a playbook interface of an artificial intelligence-assisted information technology data management and natural language playbook system, as contemplated by the present disclosure.

The illustration of FIG. 9 illustrates a playbook interface of an artificial intelligence-assisted information technology data management and natural language playbook system. Playbooks may be loaded by the user via the web-based user interface, and may be stored on the system's central database. Playbooks may be programmed by any user of the system, whether manually by the user or automatically by the system recording the user's input sequences, and made available to other users, and may be further correlated with specific IT security purposes or instructional sequences. Playbooks, when shared by a user, may be further associated with user data, such as name and experience, and the playbook platform may further incorporate a rating and comment system for user quality control purposes.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

We claim:

1. A data management and workflow system, comprising:
a proprietary software;
a natural language processor;
a plurality of workflows;
a user interface;
a central database;
wherein said proprietary software is installed on said central database;
wherein said user interface is a web-based interface between a user and said proprietary software;
wherein said proprietary software is granted access by said user to a remote security information and event management (SIEM) platform;
wherein said user interface prompts said user for a first input;
wherein said user interface receives said first input from said user;
wherein said first input is converted into an SIEM-specific command by said proprietary software;
wherein said SIEM-specific command is in a command language understood by said remote SIEM platform;
wherein said SIEM-specific command is issued to said remote SIEM platform;
wherein said remote SIEM platform returns a result to said proprietary software;
wherein said result is converted to a first output by said proprietary software; and
wherein said first output is presented to said user via said user interface.

2. The system of claim 1,
wherein said proprietary software further comprises said natural language processor;
wherein said user interface prompts said user for a first natural language input;
wherein said user interface receives said first natural language input from said user;
wherein said first natural language input is converted into an SIEM-specific command by said natural language processor of said proprietary software;
wherein said SIEM-specific command is in a command language understood by said remote SIEM platform;
wherein said SIEM-specific command is issued to said remote SIEM platform;
wherein said remote SIEM platform returns a result to said proprietary software;
wherein said result is converted to said first output by said proprietary software; and
wherein said first output is presented to said user via said user interface.

3. The system of claim 2,
wherein said user interface displays said first output and then prompts said user for a subsequent input;

wherein said subsequent input is converted to said SIEM-specific command and issued to said remote SIEM platform;
wherein said remote SIEM platform returns said result that is converted to a subsequent output and presented to said user;
wherein said prompting for said subsequent input by said user interface is repeated until said user performs a stop action;
wherein said first input and each of said subsequent inputs are recorded in the order received by said proprietary software as a sequence of commands; and
wherein said sequence of commands is stored by said proprietary software as a unique workflow.

4. The system of claim 3;
wherein said user interface receives said first input from said user;
wherein said first input is a multiple command input;
wherein said multiple command input is converted into a sequence of SIEM-specific commands by said proprietary software;
wherein a first of said sequence of SIEM-specific commands is issued to said remote SIEM platform;
wherein a next of said sequence of SIEM software commands is issued to said remote SIEM platform until all commands in said sequence of SIEM software commands have been issued;
wherein said remote SIEM platform returns a result to said proprietary software;
wherein said result is converted to said first output by said proprietary software;
wherein said first output is presented to said user via said user interface; and
wherein said multiple command input is stored by said proprietary software as a unique workflow.

5. The system of claim 4,
wherein said user interface receives said natural language input from said user;
wherein said natural language input is said multiple command input;
wherein said multiple command input is converted into a sequence of SIEM-specific commands by said natural language processor of said proprietary software;
wherein said first of said sequence of SIEM-specific commands is issued to said remote SIEM platform;
wherein said next of said sequence of SIEM software commands is issued to said remote SIEM platform until all commands in said sequence of SIEM software commands have been issued;
wherein said remote SIEM platform returns a result to said proprietary software;
wherein said result is converted to said first output by said proprietary software;
wherein said first output is presented to said user via said user interface; and
wherein said multiple command input is stored by said proprietary software as a unique workflow.

6. The system of claim 5,
wherein said user instructs said user interface to recall and execute one of said unique workflows;
wherein said sequence of commands of said unique workflow is executed by said proprietary software to generate a progression output; and
wherein said progression output is presented to said user via said user interface.

7. The system of claim 6,
wherein said first input further comprises an internet search request;
wherein said internet search request is converted into an internet search command by said proprietary software;
wherein said internet search command is issued to an internet search engine;
wherein said internet search engine returns a result to said proprietary software;
wherein said result is converted to said first output by said proprietary software; and
wherein said first output is presented to said user via said user interface.

8. The system of claim 7,
wherein said natural language input further comprises an internet search request;
wherein said internet search request is converted into an internet search command by said natural language processor of said proprietary software;
wherein said internet search command is issued to an internet search engine;
wherein said internet search engine returns a result to said proprietary software;
wherein said result is converted to said first output by said proprietary software; and
wherein said first output is presented to said user via said user interface.

9. The system of claim 8,
wherein said multiple command input comprises a plurality of SIEM-specific commands mixed with internet search requests;
wherein said plurality of SIEM-specific commands mixed with internet search requests is converted into a sequence of SIEM-specific commands mixed with internet search commands by said proprietary software;
wherein a first of said sequence of SIEM-specific commands mixed with internet search commands is issued to an appropriate database based on which of said appropriate database contains a data set relevant to each of said sequence of SIEM-specific commands mixed with internet search commands;
wherein a next of said sequence of SIEM-specific commands mixed with internet search commands is issued to said appropriate database based on which of said appropriate database contains a data set relevant to each of said sequence of SIEM-specific commands mixed with internet search commands until all commands in said sequence of SIEM-specific commands mixed with internet search commands have been issued;
wherein said appropriate database returns a result to said proprietary software;
wherein said result is converted to said first output by said proprietary software;
wherein said first output is presented to said user via said user interface; and
wherein said multiple command input is stored by said proprietary software as a unique workflow.

10. A data management and workflow system, comprising:
a proprietary software;
a natural language processor;
a plurality of workflows;
a user interface;
a central database;
wherein said proprietary software is installed on said central database;

wherein said user interface is a web-based interface between a user and said proprietary software;
wherein said proprietary software is granted access by said user to a plurality of remote security information and event management (SIEM) platforms;
wherein said user interface prompts said user for a first input;
wherein said user interface receives said first input from said user;
wherein said first input is converted into a plurality of SIEM-specific commands by said proprietary software;
wherein one each of said plurality of SIEM-specific commands is in a command language understood by one each of said plurality of remote SIEM platforms based on which of said remote SIEM platforms contains a data set relevant to each of said plurality of SIEM-specific commands;
wherein one each of said plurality of SIEM-specific commands is issued to one each of said plurality of remote SIEM platforms based on which of said remote SIEM platforms contains said data set relevant to each of said plurality of SIEM-specific commands;
wherein said plurality of remote SIEM platforms return a collection of results to said proprietary software;
wherein said collection of results is converted to a first collective output by said proprietary software; and
wherein said first collective output is presented to said user via said user interface.

11. The system of claim 10,
wherein said proprietary software further comprises said natural language processor;
wherein said user interface prompts said user for a first natural language input;
wherein said user interface receives said first natural language input from said user;
wherein said first natural language input is converted into a plurality of SIEM-specific commands by said natural language processor of said proprietary software;
wherein one each of said plurality of SIEM-specific commands is in a command language understood by one each of said plurality of remote SIEM platforms based on which of said remote SIEM platforms contains a data set relevant to each of said plurality of SIEM-specific commands;
wherein one each of said plurality of SIEM-specific commands is issued to one each of said plurality of remote SIEM platforms based on which of said remote SIEM platforms contains a data set relevant to each of said plurality of SIEM-specific commands;
wherein said plurality of remote SIEM platforms return a collection of results to said proprietary software;
wherein said collection of results is converted to said first collective output by said proprietary software; and
wherein said first collective output is presented to said user via said user interface.

12. The system of claim 11,
wherein said user interface displays said first collective output and then prompts said user for a subsequent input;
wherein said subsequent input is converted to said SIEM-specific command and issued to said remote SIEM platform;
wherein said remote SIEM platform returns said result that is converted to a subsequent collective output and presented to said user;
wherein said prompting for said subsequent input by said user interface is repeated until said user performs a stop action;
wherein said first input and each of said subsequent inputs are recorded in the order received by said proprietary software as a sequence of commands; and
wherein said sequence of commands is stored by said proprietary software as a unique workflow.

13. The system of claim 12;
wherein said user interface receives said first input from said user;
wherein said first input is a multiple command input;
wherein said multiple command input is converted into a sequence of SIEM-specific commands by said proprietary software;
wherein a first of said sequence of SIEM-specific commands is issued to one each of said plurality of remote SIEM platforms based on which of said remote SIEM platforms contains said data set relevant to said first of said sequence of SIEM-specific commands;
wherein a next of said sequence of SIEM software commands is issued to one each of said plurality of remote SIEM platforms based on which of said SIEM software contains said data set relevant to said next of said sequence of SIEM-specific commands until all commands in said sequence of SIEM software commands have been issued;
wherein said plurality of remote SIEM platforms return a collection of results to said proprietary software;
wherein said collection of results is converted to said first collective output by said proprietary software;
wherein said first collective output is presented to said user via said user interface; and
wherein said multiple command input is stored by said proprietary software as a unique workflow.

14. The system of claim 13,
wherein said user interface receives said natural language input from said user;
wherein said natural language input is said multiple command input;
wherein said multiple command input is converted into a sequence of SIEM-specific commands by said natural language processor of said proprietary software;
wherein a first of said sequence of SIEM-specific commands is issued to one each of said plurality of remote SIEM platforms based on which of said remote SIEM platforms contains said data set relevant to said first of said sequence of SIEM-specific commands;
wherein a next of said sequence of SIEM software commands is issued to one each of said plurality of remote SIEM platforms based on which of said remote SIEM platforms contains said data set relevant to said next of said sequence of SIEM-specific commands until all commands in said sequence of SIEM software commands have been issued;
wherein said plurality of remote SIEM platforms return a collection of results to said proprietary software;
wherein said collection of results is converted to said first collective output by said proprietary software;
wherein said first collective output is presented to said user via said user interface; and
wherein said multiple command input is stored by said proprietary software as a unique workflow.

15. The system of claim 14,
wherein said user instructs said user interface to recall and execute one of said collective workflows;
wherein said sequence of commands of said collective workflows is executed by said proprietary software to generate a collective progression output; and wherein said collective progression output is displayed to said user via said user interface.

16. The system of claim 15,
wherein said first input further comprises an internet search request;
wherein said internet search request is converted into an internet search command by said proprietary software;
wherein said internet search command is issued to an internet search engine;
wherein said internet search engine returns a result to said proprietary software;
wherein said result is converted to said first output by said proprietary software; and
wherein said first output is presented to said user via said user interface.

17. The system of claim 16,
wherein said natural language input further comprises an internet search request;
wherein said internet search request is converted into an internet search command by said natural language processor of said proprietary software;
wherein said internet search command is issued to an internet search engine;
wherein said internet search engine returns a result to said proprietary software;
wherein said result is converted to said first output by said proprietary software; and
wherein said first output is presented to said user via said user interface.

18. The system of claim 17,
wherein said multiple command input comprises a plurality of SIEM-specific commands mixed with internet search requests;
wherein said plurality of SIEM-specific commands mixed with internet search requests is converted into a sequence of SIEM-specific commands mixed with internet search commands by said proprietary software;
wherein a first of said sequence of SIEM-specific commands mixed with internet search commands is issued to an appropriate database based on which of said appropriate database contains a data set relevant to each of said sequence of SIEM-specific commands mixed with internet search commands;
wherein a next of said sequence of SIEM-specific commands mixed with internet search commands is issued to said appropriate database based on which of said appropriate database contains a data set relevant to each of said sequence of SIEM-specific commands mixed with internet search commands until all commands in said sequence of SIEM-specific commands mixed with internet search commands have been issued;
wherein said appropriate database returns a result to said proprietary software;
wherein said result is converted to said first output by said proprietary software;
wherein said first output is presented to said user via said user interface; and
wherein said multiple command input is stored by said proprietary software as a unique workflow.

* * * * *